Sept. 8, 1925.
H. F. ROACH
1,552,449
PHOTOGRAPHIC APPARATUS
Filed Feb. 18, 1922  2 Sheets-Sheet 1
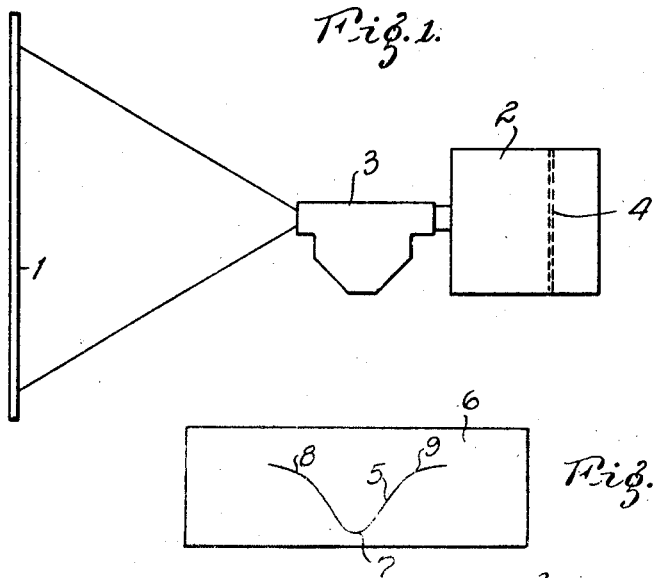
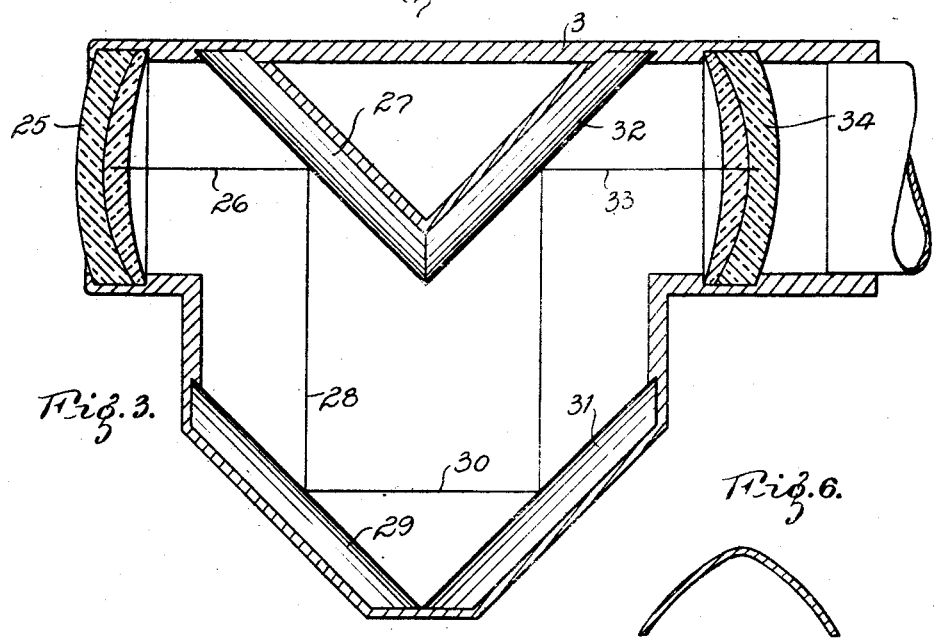
Inventor:
Harry F. Roach.
By Elliott +ammen
Attorneys Sept. 8, 1925.

H. F. ROACH 1,552,449

PHOTOGRAPHIC APPARATUS

Filed Feb. 18, 1922   2 Sheets-Sheet 2

Inventor:
Harry F. Roach.
By Elliott & Ammen
Attorneys.

Patented Sept. 8, 1925.

1,552,449

UNITED STATES PATENT OFFICE.

HARRY F. ROACH, OF ST. LOUIS, MISSOURI.

PHOTOGRAPHIC APPARATUS.

Application filed February 18, 1922. Serial No. 537,436.

*To all whom it may concern:*

Be it known that I, HARRY F. ROACH, a citizen of the United States, residing in the city of St. Louis and State of Missouri, have invented new and useful Improvements in Photographic Apparatus, of which the following is a specification.

This invention relates to optical instruments, and particularly to photographic apparatus or like apparatus, which may be used for producing photographic reproductions in which the dimensions of the object reproduced are relatively magnified in a certain direction,—that is to say, in a direction substantially parallel with a given axis. The invention has its greatest utility when employed as a means for determining the distortion in a structure while subjected to a load, or in observing the position of parts subject to minute movements. By taking a photograph of the structure before it is subjected to the load and another photograph while the structure is subjected to the load, this apparatus enables a relative magnification to be effected in the direction in which the distortions occur; in this way the distortion or movement from the normal position can be readily determined and the corresponding fiber stress computed. The apparatus is expected to be particularly useful in determining rail stresses developed by a passing train.

To construct a lens or system of lenses which would give the results that are attainable with my apparatus would involve great difficulty in the grinding of the lens, as the problem would be complicated because the resulting lens would be required to be free from astigmatism, and other defects common in the lenses.

The general object of the invention is to produce simple apparatus for enabling such anamorphous photographs to be produced; also to attain this object without necessitating the use of special lenses, that is to say, lenses which are not now commercially manufactured.

Further objects of the invention will appear hereinafter.

The invention consists in the novel features, and in the general combination of parts to be particularly described hereinafter, all of which contribute to produce a simple and efficient photographic apparatus. A preferred embodiment of my invention will be particularly described in the following specification, while the broad scope of my invention will be pointed out in the appended claims.

In the drawing,

Figure 1 is a diagrammatic view illustrating a camera in plan, embodying my invention;

Figure 2 is a view showing the character of a print or photograph which may result from the use of my apparatus;

Figure 3 is a horizontal central section through a lens box of the apparatus taken on the axis of the lens, or lenses, but showing the reflectors in plan; this view shows a modified form of my invention;

Figure 4 is a cross section showing a reflector of parabolic form which I may employ;

Figure 5 is a cross section through a reflector having a cylindrical form;

Figure 6 is a cross section through a reflector of a hyperbolic form, which I also may employ;

Figure 7:
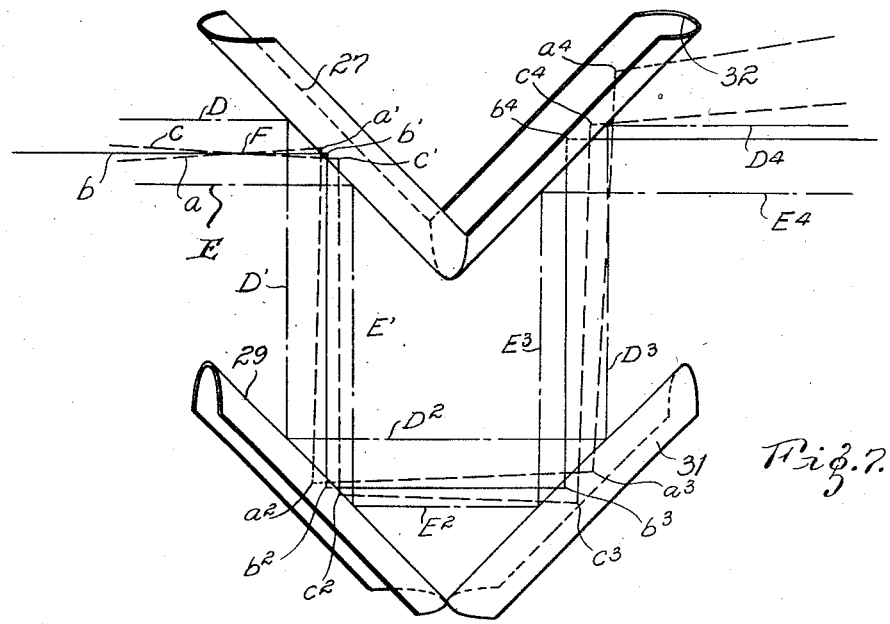
Figure 7 is a diagrammatic perspective, viewing the reflectors of Figure 3 as though seen from above, and on this view lines are placed diagrammatically indicating the general effect of the reflectors on the light rays.

In practicing the invention I employ the usual corrected lens which may be adjustably mounted in combination with a reflector having a curved reflecting surface so constructed as to co-operate with the lens to produce an image having relative magnification of distances measured parallel to a given axis. I prefer to employ a cylindrical reflecting surface, and by cylindrical I mean a surface, the elements whereof are substantially parallel to a fixed axis. For the sake of convenience I embody the apparatus in a lens box to co-operate with a lens system employing two separated lenses, and between these lenses I place a plurality of curved or cylindrical reflectors disposed with their axes parallel and so related to each other that of any two symmetrical rays in any plane other than one parallel to the geometric axis of the curved reflecting surface cylinder passing from the object lens onto the first reflector the ray having the greater angle of incidence at the first reflector will have the less angle of incidence as it impinges upon the second reflector. The effect of these reflectors is to increase the divergence of all luminous rays lying in a plane at right angles to the axes of the reflectors. The result is that the reflectors will co-operate with the lenses to produce an anamorphous image or photograph in which all measurements or ordinates parallel with a given axis will be proportionately magnified.

Referring to Figure 1, suppose that 1 represents a short length of a rail which is to be photographed while the truck of a train is passing over it. I provide a camera 2 having a lens box 3 embodying my invention. As the train is passing I take a photograph either with a moving picture camera and film or by simply exposing a plate 4 indicated by the dotted lines within the camera. My apparatus is so constructed that all of the vertical ordinates on the image are greatly magnified, and hence the resulting photograph of the rail while under stress will have somewhat the character of the curve 5 indicated on the plate or photograph 6 shown in Figure 2. The points of highest bending moment in the rail will correspond to the sharp curves or "bights" as indicated at the points 7, 8 and 9 in the curve 5. By reason of the great magnification of the vertical ordinates the curve will have a very characteristic dip in the vicinity of the loaded wheel. By the use of engineering formulas employing characteristics of the curve 5 I can readily ascertain the fiber stress within the rail.

Figure 8:
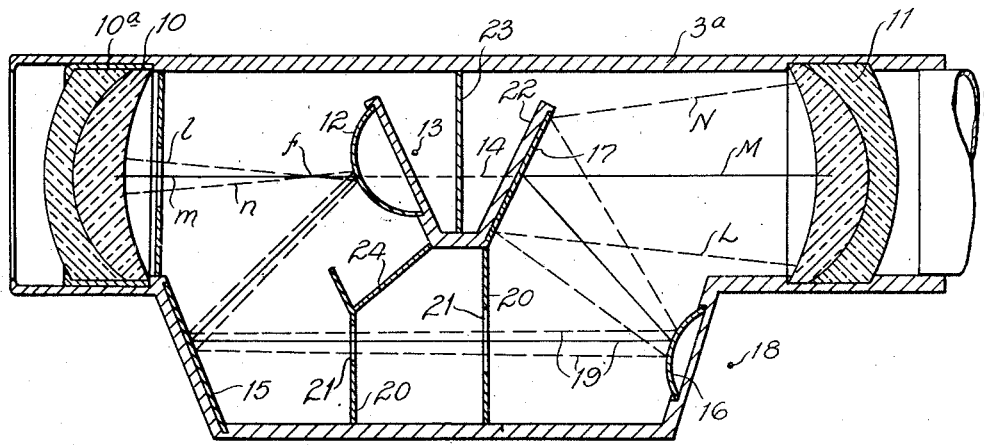
Figure 8 is a vertical section through a lens box, and illustrates the preferred embodiment of my invention.

In Figure 8 I illustrate a lens box $3^a$ in vertical section. The lens system employed may include an objective lens 10 of any approved design and a second lens 11 from which the luminous rays pass to the photographic plate or film. Between these two lenses I provide two or more convex reflectors, and I provide for directing the rays onto the reflectors in such a way that a substantially uniform or balanced distortion, or anamorphous effect is produced. In order to accomplish this I prefer to provide a curved reflector 12 having a polished or silvered outer surface, and the elements of this reflector are parallel with a fixed axis 13 which is disposed at right angles to the axis or line joining the centers of the two lenses 10 and 11. This axis 13, however, is not in direct line with the axis or axial line 14 of the lenses. The rays from the lens 10 are reflected from this reflector 12 onto a plane mirror or reflecting surface 15 from which they are reflected in a plane substantially parallel with the axis 14 so as to impinge upon a second curved reflector 16 which is substantially similar in construction to the reflector 12 but which may be curved on a somewhat larger radius if desired. From the reflector 16 the rays are reflected onto a second plane mirror or reflecting surface 17 from which they pass through the second lens 11. In order to illustrate the effect of these reflectors on the luminous rays of a beam of light let us assume that the lines $l$, $m$ and $n$ represent three rays of light passing into the principal vertical plane of the lens box, the ray $m$ may be assumed to coincide with the axial line of the lenses and impinges upon the reflector 12 at a point located substantially upon its optical central line, while the rays $l$ and $n$ are supposed to represent symmetrically disposed rays at the image with respect to the axial line 14. Remembering that the angle of reflection is always equal to the angle of incidence we can readily construct a diagram of the path of these rays, and it will be evident that the ray $l$ as finally reflected from the plane reflector 17 will have the direction indicated by the line or ray L. The ray $n$ on the other hand, as finally reflected will have the direction and position of the ray N. The ray $m$ will impinge upon the reflector 16 at a point substantially upon the optical central line of the reflector 16, and will be finally reflected at an intermediate point on the axial line of the lenses as indicated by the ray M.

It is assumed that the rays $l$, $m$ and $n$ pass through the focal point $f$ of the lens 10.

The axis 18 of the reflector 16, it will be observed, is below the direction in which the rays 19 pass from the reflector 15, whereas, the axis 13 of the reflector 12 is disposed above the direction of movement of the rays $l$, $m$ and $n$. With this arrangement it will be evident that of any two symmetrically disposed rays in any plane other than one parallel to the geometric axis of the curved reflecting surface cylinder, the ray which has the greater angle of incidence as it impinges upon the reflector 12 will have the less angle of incidence as it impinges upon the reflector 16. In this way, while the first reflector would tend to produce a magnification in the desired direction, such a magnification would not be uniform until corrected or compensated for by a second reflection on a second curved reflector. With my arrangement, however, I construct the second reflector so that its effect will be to co-operate with the first reflector to produce a balanced effect in the rays as finally reflected at the image through the second lens 11. In other words, the rays will have the same symmetrical arrangement at the image after passing through the lens 11 that they had in being received upon the first reflector 12.

In order to reduce the effect of diffused light within the lens box $3^a$ and to provide an image elongated in a horizontal direction on the resulting photograph or print, I provide the middle of the lens box with two transverse diaphragms or stops 20 having oppositely disposed slits 21 through which the rays pass. The reflectors 12 and 17 may be secured to a V-shaped support or bracket 22 between the arms of which I may provide a shield or screen 23 to prevent any possibility of light rays passing around the upper edges of the reflectors 12 and 17. I also prefer to provide a light screen 24 below the reflector 12 so as to avoid any interference by diffused light from the reflector 12 and to prevent diffused light from passing through the slits 21.

In Figure 3 I illustrate another embodiment of the invention in which I do not employ plane mirrors, but merely utilize two pairs of cylindrical or curved reflectors with the axis of curvature disposed in a horizontal plane. In this view the general path of the rays entering through the object lens 25 is indicated by the line 26 which is reflected on a convex curved reflector 27 so as to pass downwardly as indicated by the line 28, striking upon a convex curved reflector 29 which bends the rays in a horizontal direction and at the location of the line 30. The rays passing in this way are reflected in succession by the two convex reflectors 31 and 32 so that as finally reflected the rays pass along the line 33 through the second lens 34.

In Figure 7 I have illustrated by perspective, the general manner in which rays would be reflected by such an organization of lenses and reflectors. In this view F represents the focus and the three rays $a$, $b$ and $c$ pass through this focus and are supposed to lie in a vertical plane. The course of these rays as reflected from the four reflectors 27, 29, 31 and 32 would be that indicated by the lines terminating at the points $a'$, $a^2$, $a^3$ and $a^4$; $b'$, $b^2$, $b^3$ and $b^4$; $c'$, $c^2$, $c^3$ and $c^4$. It is evident that these reflectors would produce increased divergence in all rays in a general vertical direction and would, therefore, produce a magnification of all vertical ordinates or measurements on the resulting photograph. It is evident that an enlargement would result from using simply a single reflector such as the reflector 27. The use of a single reflector would produce an image unsymmetrically distorted. For example, supposing the lines D and E in Figure 7 represent two horizontal and parallel rays supposed to be disposed in the same horizontal plane. The reflectors 27 and 29 would produce an unsymmetrical distortion with respect to a vertical line on the image. The reflection on the other two reflectors corrects this. It is evident that the ray D will be reflected as indicated by the lines $D'$, $D^2$, whereas the ray E would be reflected as indicated by the lines $E'$, $E^2$. These rays will pass from the reflectors 31 and 32 in the direction indicated by the lines $D^3$, $D^4$ and $E^3$, $E^4$, respectively. It is evident that the rays $D^4$ and $E^4$ as finally reflected have the same relative position as they had when impinging upon the reflector 27.

It is evident that in a cylindrical reflector such as illustrated in Figure 5 the angle of incidence of the rays increase very rapidly as the angle becomes more acute, and hence, in order to overcome this effect I may, if desired, employ other forms such as found in the conic sections; for example, I may employ the parabolic and hyperbolic forms shown in Figures 4 and 6, or combinations of these forms. And while I prefer to have the reflector curved about a straight axis, obviously my novel effects could be secured even if the curvature of the reflector was with respect to a more or less curved axis.

Apparatus embodying my invention may be employed simply to make anamorphous reproductions of photographs already taken instead of employing it to produce an anamorphous picture directly from the object photographed.

In further explanation of the diagram Figure 7 showing the reflection of the rays $a$, $b$ and $c$ it should be stated that the indicated position of the rays on the different reflectors is ideal for the purpose of making the illustration more intelligible. As a matter of fact, a ray which impinged upon the reflector 27 while lying outside of the vertical plane, would be reflected in a lateral direction much more than as indicated by the lines representing the rays. In other words, this diagram should be understood merely as a means of exposition of the general effect of the successive reflections upon the rays, and not as an accurate representation of the paths of the reflected rays.

Of course, it is evident that by employing concave reflectors instead of convex reflectors an opposite result in the photograph or negative could be produced. That is to say, within certain limits, a relative reduction of all dimensions could be effected as measured along a given axis.

It is evident that the same lens box could be used for producing relative magnifications either in a vertical plane or a horizontal plane on the negative simply by rotating the lens box on the axis of the lenses, through 90°. For example, while the position indicated in Figure 8 would be used for photographing a horizontal object such as a rail it is evident that if this view were considered to be a horizontal section through the lens box then the apparatus would operate to produce magnification in a horizontal direction. Such a position could be used in investigating a column under a passing load or for measuring movements in a tower under stresses occasioned by a high wind.

In order to enable the object lens 10 to be adjusted toward or from the reflectors I secure the same in a sleeve 10ª mounted to slide in the lens box.

It is understood that the embodiment of the invention described herein is only one of the many embodiments my invention may take, and I do not wish to be limited in the practice of my invention now in my claims, to the particular embodiment set forth.

What I claim is.

1. In apparatus of the kind described, the combination of an optical system and a plurality of curved reflectors, each reflector having a curved reflecting surface, the elements whereof are disposed substantially parallel with a fixed axis, said reflectors being positioned to reflect the luminous rays in succession and progressively increase their dispersion on an axis of selection and co-operating with the optical system to produce an image having relative magnification of distances measured parallel to a given axis.

2. In an apparatus of the kind described, the combination of an optical system and a plurality of curved reflectors, each reflector having a curved reflecting surface, the elements whereof are disposed substantially parallel with a fixed axis, said reflectors being positioned to reflect the luminous rays in succession and progressively increase their dispersion on an axis of selection, co-operating with the optical system to produce an image having relative magnification of distances measured parallel to a given axis and having their geometric axes disposed, respectively on opposite sides of the path of light so as to reflect the rays finally at the image in the same symmetrical arrangement as they are received.

3. In apparatus of the kind described, the combination of a lens system consisting of a pair of separated lenses in combination with a plurality of curved reflectors, said curved reflectors each having a curved surface the elements whereof are parallel to a fixed axis, the axes of said reflectors being disposed substantially parallel, one of said reflectors receiving rays from one of said lenses, and plane reflectors co-operating with said curved reflectors to direct the rays through the other lens with substantially the same symmetrical arrangement as when received from the first lens.

4. In apparatus of the kind described, the combination of a lens with a pair of curved reflectors, each reflector having a curved reflecting surface the elements whereof are disposed parallel to a fixed axis, means for supporting one of the reflectors with its fixed axis disposed out of line with the axis of the lens whereby any two rays symmetrically disposed in a plane passing through the axis of the lens and at right angles to the said fixed axis of the reflector impinge upon the said first reflector at different angles of incidence, the second reflector being disposed in a position to receive the reflected rays so that the ray having the greater angle of incidence as it strikes the first reflector will have the less angle of incidence as it strikes the second reflector.

5. In apparatus of the kind described, a lens system including a pair of separated lenses in combination with a curved reflector the elements whereof are substantially parallel to a fixed axis, said reflector being disposed with its axis at right angles to the axis of the object lens but out of line therewith, a plane reflector receiving the reflected rays from the curved reflector, a second reflector receiving the rays from the plane reflector having a curved reflecting surface the elements whereof are disposed substantially parallel to a fixed axis for that reflector, which is substantially parallel to the axis of the first-named curved reflector, the axis of the second curved reflector being disposed out of line with the direction of the principal rays as reflected from the plane mirror so that of any two symmetrically disposed rays that lie in a plane at right angles to the axes of the reflectors the ray having the greater angle of incidence at the first reflector will have the less angle of incidence at the second reflector, and a plane reflector receiving the rays from the second curved reflector and directing the same through the other lens.

6. An optical instrument consisting of a lens in combination with two curved reflectors, one of which receives rays reflected from the other, the said reflectors being disposed so that the axis of the lens and the reflecting surfaces for the ray, lie between the axes of the reflectors.

7. An optical instrument involving a pair of dispersing reflecting elements co-operating in the reflection of light rays and angularly disposed so that the geometrical axes of the respective reflecting elements lie on opposite sides of the path of light to effect proportionate distortion in an image produced from the rays.

8. An optical instrument involving the combination of a pair of curved reflecting elements arranged to have light rays transmitted from one to the other, said reflecting elements having a relative position such that when two symmetrically located rays in any plane other than one parallel to the geometric axis of the curved reflecting surface cylinder in a beam of light impinge upon the first reflecting element, the rays having differing degrees of angles of incidence at their points of impingement on the first reflecting element, will have the measure of their angles of incidence reversed at the points of impingement on the second reflecting element.

9. An optical instrument involving the combination of a pair of cylindrical reflecting elements having the cross-section of a convex conic section, the one mounted to receive and project light rays received and projected from the other.

10. An optical instrument involving the combination of a pair of curved reflecting elements co-operating in the reflection of light rays of which the radius of the second is greater than that of the first, and angularly disposed with relation to each other to effect proportionate distortion in an image produced from the rays.

In testimony whereof I have hereunto set my hand.

HARRY F. ROACH.